Feb. 1, 1938. L. H. KENNON 2,107,200
VALVE
Filed May 21, 1936
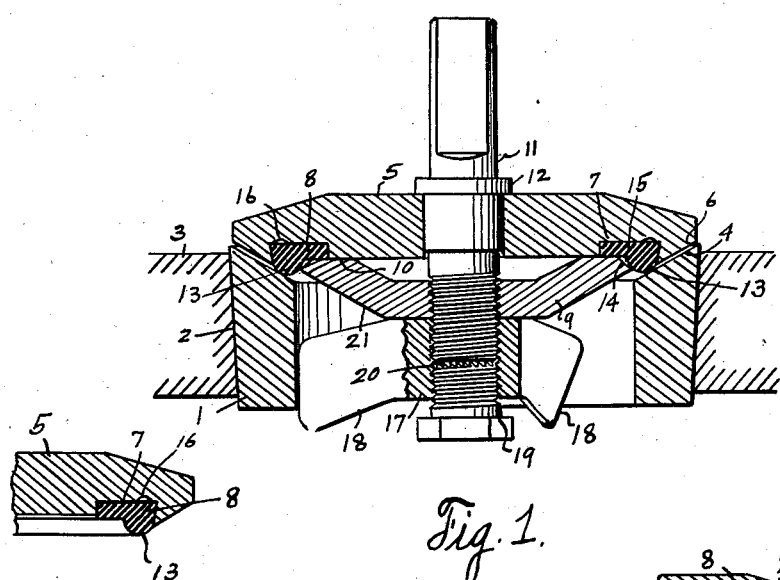
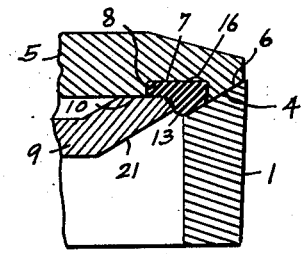
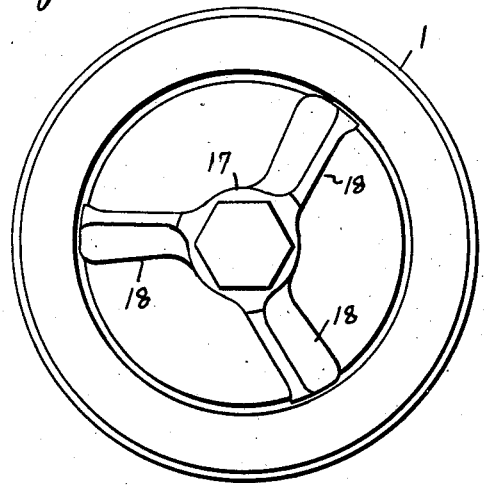
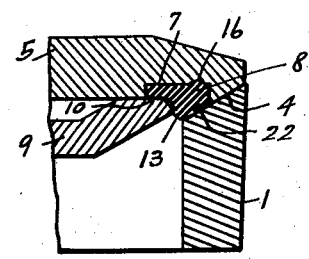
Inventor
Louis H. Kennon
By
Hardway Rather
Attorneys Patented Feb. 1, 1938

2,107,200

UNITED STATES PATENT OFFICE 2,107,200

VALVE

Louis H. Kennon, Houston, Tex.

Application May 21, 1936, Serial No. 80,935

2 Claims. (Cl. 251—129)

This invention relates to a valve.

An object of the invention is to provide in a valve a novel type of valve disc arranged to cooperate with the valve seat and having a ring of resilient material arranged to cooperate with the seat to form a fluid tight fit when the disc is seated against the valve seat.

It is another object of the invention to provide in a valve, a seat and a disc having a marginal face arranged to cooperate with said seat, the disc being provided with a ring formed of rubber or other resilient material and which is arranged around the inner portion of the face of said disc, said ring being shaped to contact with the inner portion of the seat, when the valve is closed, to form a fluid tight joint.

A further object of the invention is to provide novel means for clamping said resilient ring in place.

It is still another object of the invention to provide in a valve, an assembly comprising a valve disc, a resilient ring seated therein and a clamp plate for clamping the ring securely in position, said assembly being provided with spaces into which the material of the ring may flow when the disc is fully seated on the valve seat and particularly when a foreign object is located on the valve seat when the valve is in closed position whereby the ring will be subjected to unusual pressure.

A further object of the invention resides in the provision, in a valve, of an assembly comprising a valve disc having a marginal tapering face arranged to seat against a correspondingly tapered face of the valve seat with a resilient ring seated in the disc and arranged around the inner portion of the tapering face with a clamp plate secured to the disc and clamping the ring in place and having a tapering face offset with respect to the face of the disc whereby to provide sufficient space between the tapering face of the clamp plate and the seat to prevent the injury to or mutilation of the ring when the disc is fully seated on the valve seat.

Novel means are also provided for securing the valve disc, the resilient ring, the clamp plate and the valve guide in assembled relation.

With the above and other objects in view the invention has particular relation to certain novel features of construction, operation and arrangement of parts, an example of which is given in this specification and illustrated by the accompanying drawing, wherein:

Figure 1 shows a vertical sectional view of the valve showing the valve disc approaching a fully seated position.

Figure 2 shows a lower end view thereof.

Figure 3 shows a fragmentary sectional view of the valve disc showing the resilient ring seated therein.

Figure 4 shows a fragmentary vertical sectional view of the valve, showing the disc fully seated, and Figure 5 shows a fragmentary vertical sectional view of the valve, showing the disc fully seated with a foreign object held on the valve seat by the resilient ring.

Referring now more particularly to the drawing, wherein like numerals of reference designate similar parts in each of the figures, the numeral 1 designates the valve seat which is substantially cylindrical in shape but whose outer side tapers downwardly to fit a correspondingly shaped opening 2 in the pump partition 3. The upper end of the seat 1 has the upwardly and outwardly flared face 4. The numeral 5 designates a valve disc the underside of whose outer margin has the tapering face 6 arranged to cooperate with and to seat against the face 4 when the valve is closed. Adjacent the inner side of the face 6 there is the annular groove 7 in the underside of the disc 5. This groove is substantially rectangular in cross section. Fitted into the groove 7 there is a ring 8 formed of yieldable material, such as rubber. This ring is slightly thicker at its inner margin than the depth of the groove 7 and thus projects slightly beyond the lower face of the disc 5 as shown in Figure 3. There is a clamp plate 9 substantially concavo-convex with its convex side upwardly. This plate has an annular flat face 10 which is fitted against the underside of the inner disc 5 and which is clamped against the inner margin of the ring 8. There is an axial stem 11 fitted through the disc 5 and having an annular rib 12 thereon which abuts the upper side of said disc. The stem 11 is threaded through the clamp plate 9 and holds the face 10 thereof clamped firmly against the inner or under side of the disc 5 as well as against the inner margin of the ring 8 so as to hold the plate 9 against movement and so as to clamp the ring 8 securely in place.

At the outer margin of the ring there is an annular rib 13 of oval contour and formed of the same material as that of the ring.

The extreme outer margin of the plate 9 is beveled forming an annular face 14 so as to provide an annular space 15 between the clamp plate 9 and the ring 8.

In the bottom of the groove 7 near its outer margin there is an additional groove 16, the space 15 and the groove 16, thus providing additional space into which the rubber of the ring 8 will flow when said ring is subjected to pressure on the seating of the valve disc hereinafter explained.

Screwed onto the lower end of the stem 11 there is a guide 17 having the radial wings 18 whose outer ends ride against the inner wall of the seat 1 to guide the valve disc. The wings 18 are correspondingly spiralled so as to cause the disc 5 to gradually rotate as the disc is reciprocated during the operation of the pump in which the valve is located.

Screwed into the guide 17 from beneath there is a plug 19 of harder material than that of the stem 11 and the inner end of this guide has the ratchet teeth 20 which are pitched in a direction the opposite of that of the threads of the plug to the end that when the plug 19 is screwed fully home the teeth 20 will frictionally engage and bite into the material of the opposing end of the stem 11 and will engage said material so as to prevent the unscrewing of either said plug or the stem 11 under the vibration to which the valve is subjected.

It is to be noted that the under face 21 of the clamp plate 9 is offset upwardly from the plane of the face 6 so that the plane of the face 21 will be spaced away from the face 4 when the disc 5 is fully seated. This is more accurately shown in Figures 4 and 5 and will allow ample space for the material of the rib 13 when the ring 8 is subjected to pressure upon seating of the disc, and will prevent the rib 13 from being pinched between the outer margin of the plate 9 and the inner edge of the face 4.

When the valve disc 5 approaches its seat the rib 13 will first come into contact with the face 4 of the seat 1 and when said disc is fully seated against the face 4 the rib 13 will be distorted the material flowing between the margin of the clamp plate 9 and the inner margin of the face 4 as shown in Figures 4 and 5 and partly into the spaces 15 and 16. At times the ring 8 may seat against a foreign object 22 on the face 4 thus subjecting the ring to additional pressure at that point and the space 16 has been primarily provided to permit the material of the ring 8 to flow into it when the ring is subjected to this unusual pressure as indicated in Figure 5.

In valves of this general type the resilient ring is usually placed around the outer margin of the tapering face of the disc. In the present construction however the resilient ring 8 has been placed at the inner margin of the face 6, thus occupying smaller area and leaving the larger area of said face 6, which is of metal, to receive the strokes against the face 4 during the reciprocation of the disc while the pump is in operation and thus conducing to a longer life of the valve.

This type of valve is primarily intended for use in slush pumps for handling gritty fluid under high pressure although capable of general use wherever a valve of this type may be suitable.

The drawing and description disclose what is now considered to be a preferred form of the invention, by way of illustration only, while the broad principle of the invention will be defined by the appended claims.

What I claim is:—

1. In a valve, a valve disc having an annular face adapted to contact with a valve seat and having an annular groove approximately rectangular in cross section and arranged within said face, a ring of resilient material seated in the groove, said assembly having an annular space completely covered by said ring and into which the material of the ring may flow when the ring is subjected to a compressive force, said ring having an annular rib thereon arranged to contact the seat, when the disc is in closed position, a clamp plate fitted and secured closely against the disc whose margin clamps the inner margin of the ring between it and the disc, the outer margin of the clamp plate being formed with an annular face whose margins contact said ring and cover an annular space between the marginal face of the clamp plate and the ring.

2. In a valve, a valve disc having an annular face adapted to contact with a valve seat, said disc having an annular groove therearound adjacent the inner margin of said face, a ring of resilient material in said groove, said assembly having an annular space completely covered by the ring, the inner margin of the ring being thicker than the depth of the groove, a clamp plate secured against the inner side of the disc and whose outer margin is clamped against and compresses the inner margin of the ring, the outer margin of the ring having an oval annular rib adapted to seat against and to be compressed by said seat when the disc is in closed position, the abutting parts of the ring and clamp plate being shaped to provide an annular enclosed space between them.

LOUIS H. KENNON.